United States Patent
Sato et al.

(10) Patent No.: US 7,695,264 B2
(45) Date of Patent: Apr. 13, 2010

(54) MOLD FOR FORMING GOLF BALL

(75) Inventors: Katsunori Sato, Chichibu (JP); Yoichi Omura, Tokyo (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 11/871,635

(22) Filed: Oct. 12, 2007

(65) Prior Publication Data

US 2009/0098950 A1   Apr. 16, 2009

(51) Int. Cl.
B29C 45/14 (2006.01)
(52) U.S. Cl. .................. 425/116; 425/556; 425/444
(58) Field of Classification Search .............. 425/116, 425/556, 444
See application file for complete search history.

(56) References Cited

U.S. PATENT DOCUMENTS

| | | | | |
|---|---|---|---|---|
| 3,555,620 | A | * | 1/1971 | Bucy .......................... 425/149 |
| 5,879,599 | A | * | 3/1999 | Inoue et al. ................... 264/102 |
| 6,050,803 | A | * | 4/2000 | Omura et al. ................ 425/116 |
| 6,817,852 | B2 | * | 11/2004 | Lavallee ..................... 425/116 |
| 7,201,862 | B2 | | 4/2007 | Endo et al. |
| 2004/0058029 | A1 | * | 3/2004 | Vargas ........................ 425/444 |
| 2004/0251576 | A1 | | 12/2004 | Endo et al. |
| 2005/0244530 | A1 | * | 11/2005 | Puniello et al. ............. 425/116 |
| 2006/0269651 | A1 | * | 11/2006 | Hirao .......................... 425/556 |

FOREIGN PATENT DOCUMENTS

| JP | 61235108 A | * | 10/1986 |
|---|---|---|---|
| JP | 05104530 A | * | 4/1993 |
| JP | 2000-037480 A | | 2/2000 |
| JP | 200225643 A | * | 1/2002 |
| JP | 2002-224245 A | | 8/2002 |
| JP | 2003-190332 A | | 7/2003 |
| JP | 2004-215684 A | | 8/2004 |
| JP | 2006-304943 A | | 11/2006 |

OTHER PUBLICATIONS

Mechanical partial translation of JP 2004-215684 dated Aug. 2004 obtained from the JPO website.*

* cited by examiner

Primary Examiner—Robert B Davis
(74) Attorney, Agent, or Firm—Sughrue Mion, PLLC

(57) ABSTRACT

There are provided a golf ball molding die capable of manufacturing a golf ball having a satisfactory surface condition, and a golf ball manufactured by using the die. The present golf ball molding die comprises at least two die bodies within which a cavity for molding a golf ball is formed by jointing of the die bodies; and a pin accommodating hole provided in at least one of the die bodies, and is characterized in that at least one groove communicating directly with the cavity is provided in the wall surface of the pin accommodating hole.

5 Claims, 3 Drawing Sheets

MOLD FOR FORMING GOLF BALL

BACKGROUND OF THE INVENTION

The present invention relates to a golf ball molding die and a golf ball manufactured by using the die. More particularly, it relates to an improvement of a die used for molding a golf ball.

A golf ball is usually manufactured by an injection molding process or a compression molding process. In the case of an injection molding process, an injection molding die is used. In this injection molding die, a spherical cavity is formed.

When a golf ball is molded, air that is present in a gap between the wall surface of the cavity and a rubber elastic body, which is the core material for the golf ball, and a volatile constituent such as a gas released mixedly with a resin are discharged to the outside of the die through a gap between a support pin for supporting the golf ball in the cavity and a support pin accommodating hole.

If the air and the volatile constituent such as a gas are not discharged well, what is called a weld-mark such as a bird footprint is formed on the surface of the golf ball (weld defect). Further, in some cases, a defect called "burning" may be produced by adiabatic compression of gas in the cavity. To prevent such defects, a large venting hole is conventionally provided to dissipate the gas. In this case, however, the clearance between the pin and the hole must be made large, which results in the production of relatively large burrs on the surface of the golf ball. As a result, a full-scale burr treatment process must be introduced, so that there arises a problem of significantly increased manufacturing cost.

As another method for dissipating the gas, Japanese Unexamined Patent Application Publication No. 2004-215684 has proposed a technique in which a plurality of convex parts and concave parts are formed alternately in the circumferential direction on the side surface of the support pin. Thereby, the clearance between the concave part and the accommodating hole is increased. However, this support pin has a problem of being easily broken as compared with the case where the convex parts and concave parts are absent.

SUMMARY OF THE INVENTION

The present invention has been made in view of the above circumstances, and accordingly an object thereof is to provide a golf ball molding die that can produce a golf ball having a satisfactory surface condition by preventing the formation of burrs while a gas generated at the time of molding can be released to the outside smoothly and surely, and a golf ball manufactured by using the die.

To achieve the above object, the present golf ball molding die comprises at least two die bodies within which a cavity for molding a golf ball is formed by jointing of the die bodies; and a pin accommodating hole provided in at least one of the die bodies, wherein at least one groove, such as a slit, communicating directly with the cavity is provided in the wall surface of the pin accommodating hole.

The pin accommodating hole can be made a support pin accommodating hole in which a support pin for supporting the golf ball in the cavity advances and retreats.

One of the grooves can be provided on the opposite side from the center of the cavity with the center of the support pin accommodating hole being positioned therebetween.

The grooves can be formed at two or more locations, and the grooves can be provided at predetermined intervals in the circumferential direction of the pin accommodating hole.

The depth of the groove can be made not shallower than about 5 μm and not deeper than about 0.1 mm.

Another aspect of the present invention is a golf ball. The golf ball is manufactured by using the die comprising at least two die bodies within which the cavity for molding the golf ball is formed by jointing of the die bodies; and the pin accommodating hole provided in at least one of the die bodies, wherein at least one groove communicating directly with the cavity is provided in the wall surface of the pin accommodating hole.

DESCRIPTION OF THE PREFERRED EMBODIMENTS

A configuration of one embodiment of the present invention will now be described in detail by reference to the accompanying drawings.

Figure 1:
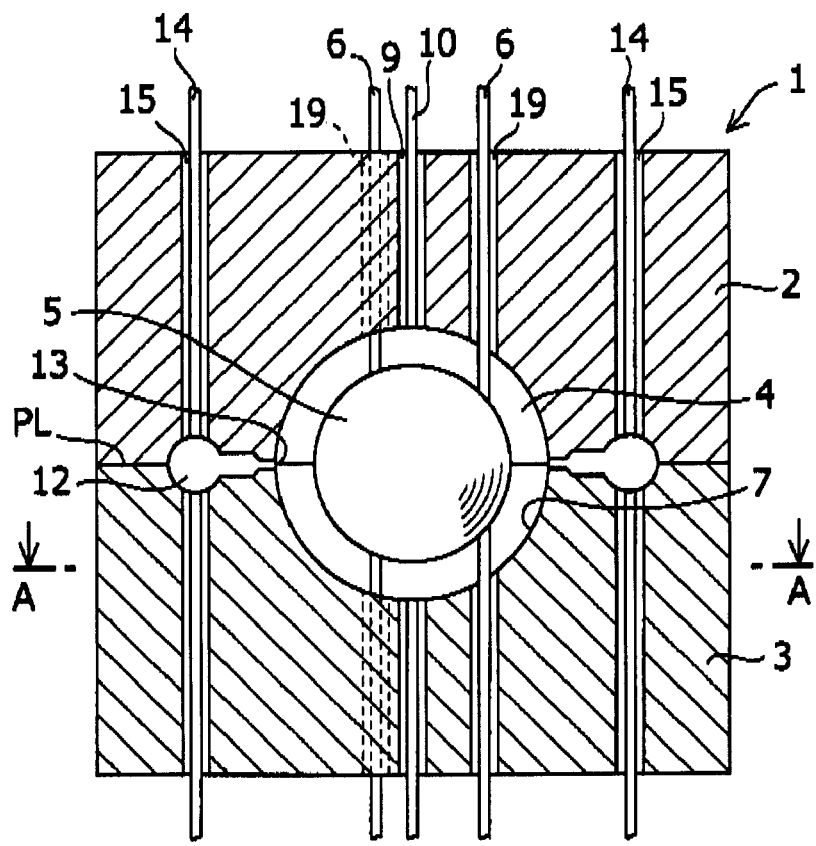
FIG. 1 is a sectional view of a golf ball molding die in accordance with one embodiment of the present invention.

In the case where a golf ball is manufactured by an injection molding process, an injection molding die 1, for example, as shown in FIG. 1, is used. This injection molding die 1 comprises an upper die 2 and a lower die 3 that are made of a metal. By separably joining the upper die 2 and the lower die 3 to each other, a spherical cavity 4 is formed in the die 1.

Figure 2:
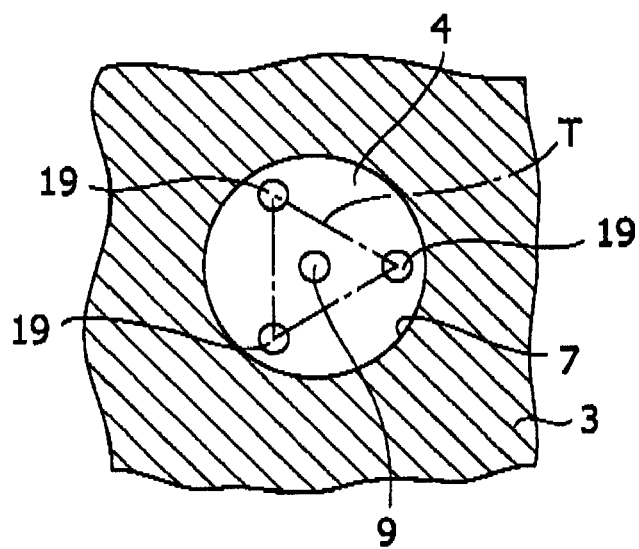
FIG. 2 is a plan view of a die viewed in the direction of the arrows A-A of FIG. 1.

As a specific example, the case where a two-piece solid golf ball is manufactured by molding a cover around a rubber elastic body is explained. As shown in FIG. 1, on a cavity wall surface 7 of the die 1, a large number of protrusions (not shown) for forming dimples on the ball surface (cover surface) are provided. A division plane PL of the upper die 2 and the lower die 3 is located at a position corresponding to the equator of the cavity 4. As shown in FIG. 2, on the cavity wall surface 7, three support pin accommodating holes 19 extending in the direction perpendicular to the division plane PL of the die 1 are provided. These three holes are located at the vertexes of a regular triangle T whose center of gravity is the center axis of the cavity. In each of the support pin accommodating holes 19, a support pin 6 for supporting a rubber elastic body (solid core) 5 is disposed so as to advance and retreat. By advancing these support pins 6 into the cavity 4, the rubber elastic body 5 having been molded in advance in a separate process can be held in the central part of the cavity 4. Further, at positions corresponding to the North Pole and the South Pole of the cavity 4, a gas vent pin 10 for releasing a gas and an accommodating hole 9 for accommodating the gas vent pin 10 are provided.

A ring-shaped runner 12 is provided so as to surround the equator of the cavity 4. A plurality of molding material pouring gates 13 that are open into the cavity 4 are provided at equal intervals along the circumferential direction in the inner peripheral part of the ring-shaped runner 12. A cover material whose main constituent is an ordinary thermoplastic resin is supplied by injection through the molding material pouring gates 13. Immediately before the finish of injection of the cover material, the tip ends of the support pins 6 for supporting the rubber elastic body retreat to the level of the cavity wall surface 7, and the injection molding is finished.

Also, above the periphery of the ring-shaped runner 12 of the die 1, a plurality of ejector pins 14 that can be raised and lowered in the direction perpendicular to the division plane PL are provided at plural locations. After molding, when the resin having cured in the runner 12 adheres to the interior of the die 1 and is difficult to separate, by raising these ejector pins 14, a pressure is applied, by which mold release can be accomplished easily.

In the golf ball molding die, the difference in diameter between the gas vent pin 10 and the accommodating hole 9 therefor is usually set at about 40 μm, and the difference in diameter between the support pin 6 and the accommodating hole 19 therefor is usually set at about 25 μm. Also, the difference in diameter between the ejector pin 14 and the accommodating hole 15 therefor is usually set at about 25 μm. When a golf ball is molded, the air that is present in the gap between the wall surface 7 of the cavity 4 and the rubber elastic body 5 and the volatile constituent such as a gas released mixedly with the resin are discharged to the outside of the die 1 through the gap between the gas vent pin 10 and the gas vent pin accommodating hole 9. Alternatively, the air and the volatile constituent are also discharged to the outside of the die 1 through the gap between the support pin 6 and the support pin accommodating hole 19.

Figure 3:
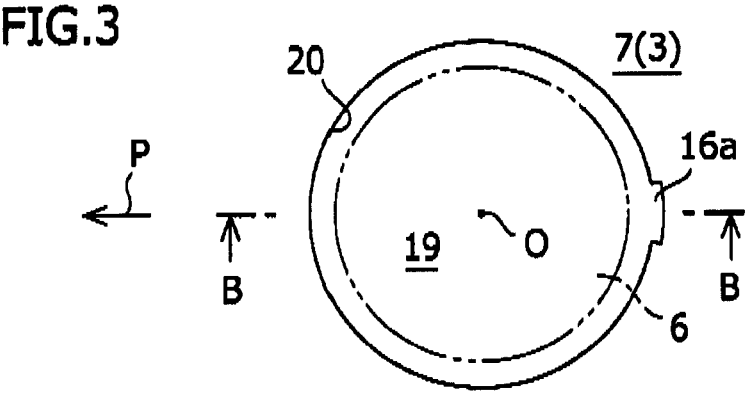
FIG. 3 is an enlarged plan view of a support pin accommodating hole shown in FIG. 2.

FIG. 3 is an enlarged plan view of the support pin accommodating hole 19 provided in the golf ball molding die 1 shown in FIG. 1. In the wall surface 20 of the support pin accommodating hole 19 is provided a slit 16a. This slit 16a has a shape depressed to the outside of the support pin accommodating hole 19. The two side walls of the slit 16a are formed on the straight lines radiating from the center O of the support pin accommodating hole 19. The back wall of the slit 16a is formed on the concentric circle of the support pin accommodating hole 19. Symbol P denotes the direction toward the center of the cavity 4.

The slit 16a is provided on the opposite side from the center of the cavity 4 with the center O of the support pin accommodating hole 19 being positioned between the slit 16a and the cavity center.

The clearance between the wall surface 20 of the support pin accommodating hole 19 and the support pin 6 is preferably as small as possible. Specifically, the upper limit of the clearance between the wall surface 20 of the support pin accommodating hole 19 and the support pin 6 is preferably about 30 μm, further preferably about 25 μm. The lower limit thereof is preferably about 10 μm, further preferably about 15 μm.

The lower limit of the depth of the slit 16 is preferably about 5 μm. The upper limit thereof is preferably about 0.1 mm, further preferably about 80 μm.

Figure 4:
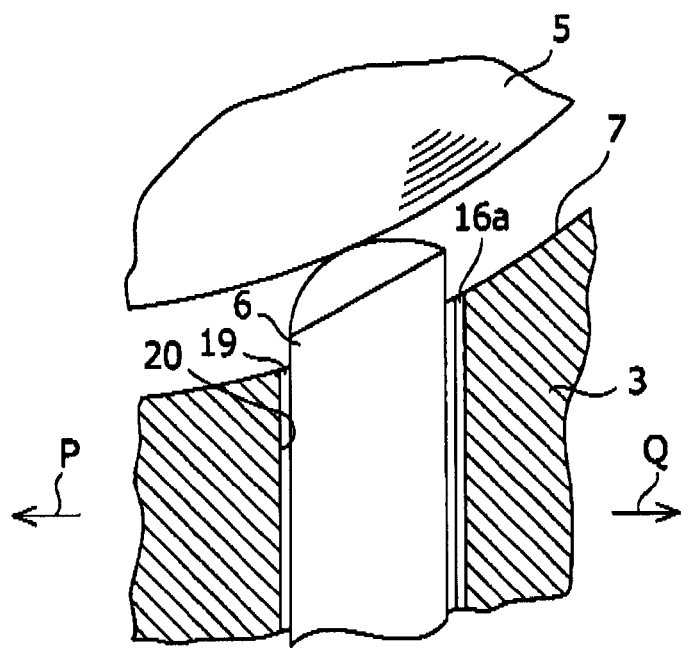
FIG. 4 is an enlarged sectional view of a support pin accommodating hole viewed in the direction of the arrows B-B of FIG. 3.

FIG. 4 is an enlarged sectional view showing a part of the lower die 3 forming the die 1 shown in FIG. 1. As can be seen from FIG. 4, the support pin 6 supports the rubber elastic body 5. The support pin 6 is tilted slightly in the direction Q opposite to the direction P toward the center of the cavity 4 by the weight of the rubber elastic body 5. Therefore, the clearance in the direction Q between the support pin 6 and the support pin accommodating hole 19 decreases. However, the air and gas can be discharged through the slit 16a provided in the direction Q as viewed from the center O of the support pin accommodating hole 19.

The number and shape of the slits are not limited to those shown in FIG. 3. For example, a variation explained below can be employed.

Figure 5:
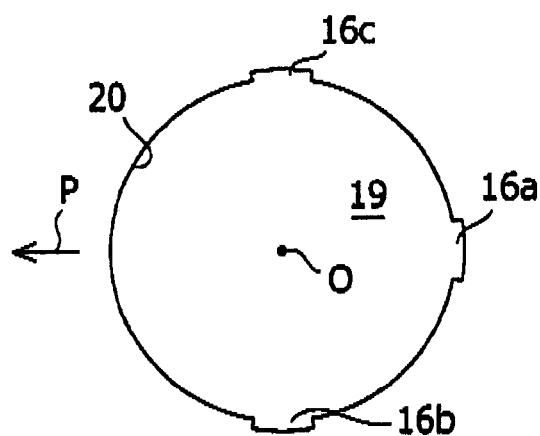
FIG. 5 is an enlarged plan view of a support pin accommodating hole in accordance with another embodiment.

FIG. 5 is an enlarged plan view of the support pin accommodating hole 19 comprising slits 16a, 16b and 16c. This support pin accommodating hole 19 differs from the accommodating hole 19 shown in FIG. 3 in that the slits 16b and 16c are provided additionally.

The slit 16b is provided at a position moving through 90 degrees clockwise around the center O at the periphery of the support pin accommodating hole 19 from the slit 16a. The slit 16c is provided on the opposite side from the slit 16b with the center O being positioned therebetween. That is to say, the space between the slit 16a and the slit 16b is equal to the space between the slit 16a and the slit 16c.

Figure 6:
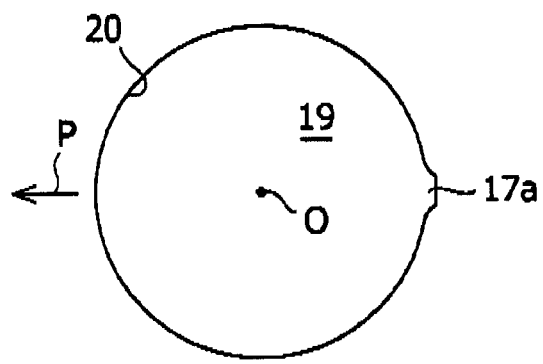
FIG. 6 is an enlarged plan view of a support pin accommodating hole in accordance with still another embodiment.
Figure 7:
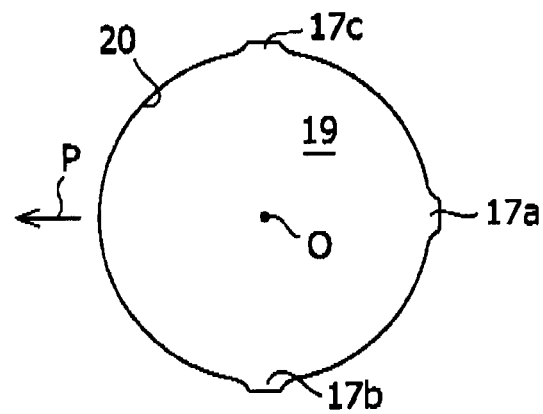
FIG. 7 is an enlarged plan view of a support pin accommodating hole in accordance with still another embodiment.

FIG. 6 is an enlarged plan view of the support pin accommodating hole 19 comprising a slit 17a. FIG. 6 shows the support pin accommodating hole 19 in which the slit 16a shown in FIG. 3 is replaced with the slit 17a. The slit 17 has a shape in which the corner parts of the slit 16 are rounded. FIG. 7 is an enlarged plan view of the support pin accommodating hole 19 comprising a plurality of slits 17, that is, slits 17a, 17b and 17c. The slit 17 is preferable because it can be formed easily.

Figure 8:
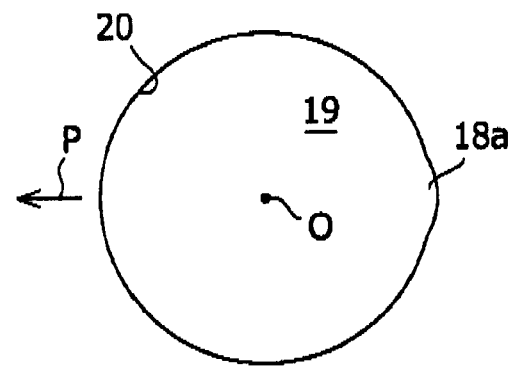
FIG. 8 is an enlarged plan view of a support pin accommodating hole in accordance with still another embodiment.
Figure 9:
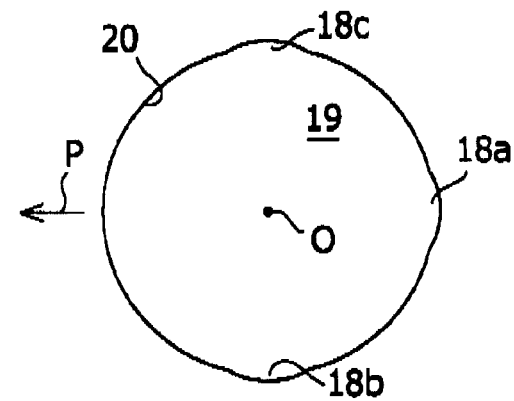
FIG. 9 is an enlarged plan view of a support pin accommodating hole in accordance with still another embodiment.

FIG. 8 is an enlarged plan view of the support pin accommodating hole 19 comprising a slit 18a. FIG. 8 shows the support pin accommodating hole 19 in which the slit 16a shown in FIG. 3 is replaced with the slit 18a. The wall of the slit 18 is formed into an arcuate shape. FIG. 9 is an enlarged plan view of the support pin accommodating hole 19 comprising a plurality of slits 18, that is, slits 18a, 18b and 18c.

To manufacture the inventive golf ball molding die, a method in which the die is directly cut three-dimensionally by using three-dimensional CAD (Computer Aided Design) and three-dimensional CAM (Computer Aided Manufacturing) can be employed. Alternatively, wire machining or electrical discharge machining can also be performed.

A golf ball manufactured by using the inventive golf ball molding die has a satisfactory surface condition because the formation of burrs can be prevented while air and volatile constituent are discharged through the slit 16a.

The above is an explanation of specific embodiments of the inventive golf ball molding die. However, the present invention is not limited to the above-described embodiments. All changes and modifications that are apparent to those skilled in the art are embraced in the technical scope of the present invention. For example, the shapes of the support pin and support pin accommodating hole can be determined appropriately.

What is claimed is:

1. A golf ball molding die comprising:
at least two die bodies within which a cavity for molding a golf ball is formed by jointing of the die bodies; and
a support pin accommodating hole provided in at least one of the die bodies, wherein a support pin for supporting the golf ball in the cavity advances and retreats in the support pin accommodating hole,
wherein at least one groove communicating directly with the cavity is provided in the wall surface of the support pin accommodating hole, except a center-axis side of the wall surface.

2. The golf ball molding die of claim 1, wherein the grooves are formed at two or more locations, and the grooves are provided at predetermined intervals in the circumferential direction of the support pin accommodating hole.

3. The golf ball molding die of claim 1, wherein the depth of the groove is not shallower than about 5 μm and not deeper than about 0.1 mm.

4. The golf ball molding die of claim 1, wherein the clearance between the wall surface of the support pin accommodating hole and the support pin is not less than about 10 μm and not greater than about 25 μm.

5. The golf ball molding die of claim 1, wherein the at least one groove is selected from the following group consisting of:

a groove having side walls formed on the straight lines radiating from the center of the support pin accommodating hole, and the back wall of the groove is formed on a concentric circle of the support pin accommodating hole;

a groove having a back wall, the back wall being formed on a concentric circle of the support pin accommodating hole, wherein the groove has a shape in which the corner parts of the wall of the support pin accommodating hole and the back wall are rounded; and a groove having a wall formed in an arcuate shape.

* * * * *